(12) United States Patent
Higashijima et al.

(10) Patent No.: US 8,313,536 B2
(45) Date of Patent: Nov. 20, 2012

(54) FUNCTIONAL MEMBER HAVING SURFACE CLEANLINESS

(75) Inventors: Jiro Higashijima, Koshi (JP); Satoshi Kaneko, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 447 days.

(21) Appl. No.: 12/677,173

(22) PCT Filed: Feb. 23, 2009

(86) PCT No.: PCT/JP2009/053188
§ 371 (c)(1),
(2), (4) Date: Apr. 1, 2010

(87) PCT Pub. No.: WO2009/110341
PCT Pub. Date: Sep. 11, 2009

(65) Prior Publication Data
US 2010/0204393 A1    Aug. 12, 2010

(30) Foreign Application Priority Data
Mar. 4, 2008 (JP) ................... 2008-053606

(51) Int. Cl.
*C08J 7/00* (2006.01)
*C08J 7/02* (2006.01)
*C08J 7/12* (2006.01)
*C08J 7/18* (2006.01)

(52) U.S. Cl. ............... 8/115.54; 525/326.2; 524/847; 438/800

(58) Field of Classification Search ............. 8/115.54; 525/326.2; 438/800; 524/847
See application file for complete search history.

(56) References Cited

U.S. PATENT DOCUMENTS
| | | | | |
|---|---|---|---|---|
| 4,434,355 | A | * | 2/1984 | Inagaki et al. ............ 219/216 |
| 5,444,116 | A | * | 8/1995 | Amin et al. ............... 524/495 |
| 7,125,598 | B2 | * | 10/2006 | Yamato et al. ............ 428/141 |

FOREIGN PATENT DOCUMENTS
| | | | |
|---|---|---|---|
| JP | 08-512355 | A1 | 12/1996 |
| JP | 2003-041083 | A1 | 2/2003 |
| JP | 2003253073 | A  * | 9/2003 |
| WO | 95/02633 | A1 | 1/1995 |
| WO | 01/79337 | A1 | 10/2001 |

* cited by examiner

*Primary Examiner* — Kelechi Egwim
(74) *Attorney, Agent, or Firm* — Burr & Brown

(57) ABSTRACT

Provided is a functional member 4 comprising a fluororesin containing a carbon material 2 and having surface cleanliness, wherein the content of the carbon material 2 in a surface portion 4*a* of the functional member 4 is significantly less than the content of the carbon material 2 in an inner portion 4*b* of the functional member 4.

10 Claims, 5 Drawing Sheets

FUNCTIONAL MEMBER HAVING SURFACE CLEANLINESS

FIELD OF THE INVENTION

The present invention relates to a functional member having surface cleanliness, such as the one used for a semiconductor manufacturing equipment and the like.

BACKGROUND ART

Among the semiconductor manufacturing equipments, there are ones that treat semiconductor wafers (hereinafter, referred to simply as wafers) by using chemicals or the like. As constructional members of such equipments, it is necessary to use ones which have chemical resistance and, at present, fluororesins, which have excellent chemical resistance, are used for such members.

However, the fluororesins have relatively low mechanical strength and, thus, when they are used as members for the semiconductor manufacturing equipments, it is necessary to take measures such as increasing the thickness of the fluororesins or reinforcing them with metals. Further, it is noted that, because the fluororesins have large coefficients of thermal expansion, thermal expansion has to be considered when they are used at high temperature.

Here, there is known a technique whereby a tetrafluoroethylene/perfluoroalkyl vinyl ether copolymer (PFA) and polytetrafluoroethylene (PTFE) are made to contain carbon powder. If this technique is employed, thermal expansion can be suppressed by the carbon powder contained in these fluororesins.

Further, there is disclosed a technique whereby PTFE is made to contain carbon fiber (for example, see Japanese Patent Laid-Open Publication No. 2003-41083). When this technique is applied, it is possible not only to suppress thermal expansion but also to improve mechanical strength, due to the carbon fiber contained in the fluororesins.

However, in these techniques, the carbon powder and the like are exposed on the surface of PFA and PTFE. Therefore, when a member formed by a fluororesin containing such carbon powder and the like is used for a semiconductor manufacturing equipment, the carbon powder and the like become exposed to a chemical and the like. As a result, the carbon powder and the like might get dissolved in the chemical and the like to contaminate the wafer.

DISCLOSURE OF THE INVENTION

The present invention was made in order to solve the above problem. That is, an object is to provide a functional member having improved cleanliness of its surface portion and a method for manufacturing the same, while maintaining functional strength inherently possessed by a member made of a fluororesin containing a carbon material. Furthermore, it is an object to provide a semiconductor manufacturing equipment which can suppress contamination of a semiconductor substrate.

According to one embodiment of the present invention, there is provided a functional member comprising a fluororesin containing a carbon material and having surface cleanliness, wherein the content of the carbon material in a surface portion of the functional member is significantly less than the content of the carbon material in an inner portion of the functional member.

According to another embodiment of the present invention, there is provided a method for manufacturing a functional member having surface cleanliness, comprising: preparing a member which is formed by a fluororesin containing a carbon material and has a predetermined shape; and exposing the member to an oxidizing gas to remove the carbon material present in the surface portion of the member.

According to another embodiment of the present invention, there is provided a semiconductor manufacturing equipment, comprising the functional member of the present invention.

According to the functional member of the one embodiment of the present invention, because the content of the carbon material in the surface portion of the functional member is significantly less than the content of the carbon material in the inner portion of the functional member, there can be provided a functional member having improved cleanliness of the surface portion, while maintaining the mechanical strength inherently possessed by a fluororesin containing a carbon material.

According to the method for manufacturing the functional member of another embodiment of the present invention, because the carbon material present in the surface portion of the member can be removed by exposing the member, formed by a fluororesin containing a carbon material, to an oxidizing gas, there can be provided a functional member having improved cleanliness of the surface portion, while maintaining the mechanical strength inherently possessed by a fluororesin containing a carbon material.

According to the semiconductor manufacturing equipment of another embodiment of the present invention, because it comprises a functional member having improved cleanliness of the surface portion, contamination of the semiconductor substrate by a carbon material can be suppressed.

DESCRIPTION OF THE PREFERRED EMBODIMENTS

First Embodiment

Figure 1A:
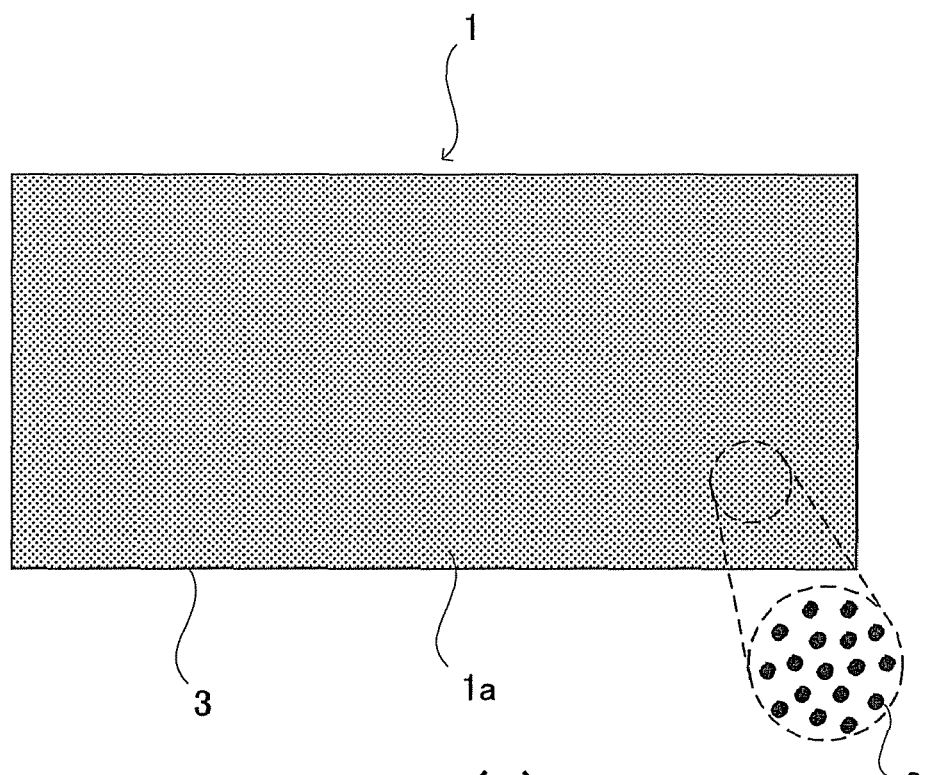
FIG. 1(a) and FIG. 1(b) are a plan view and a vertical sectional view, respectively, of a member relating to the first embodiment.
Figure 1B:
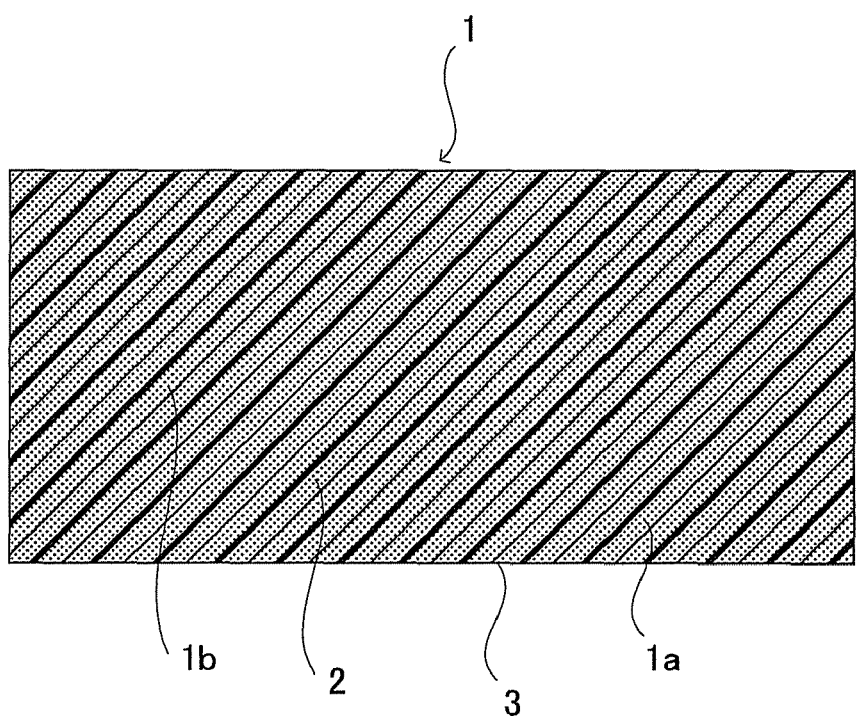
Figure 2A:
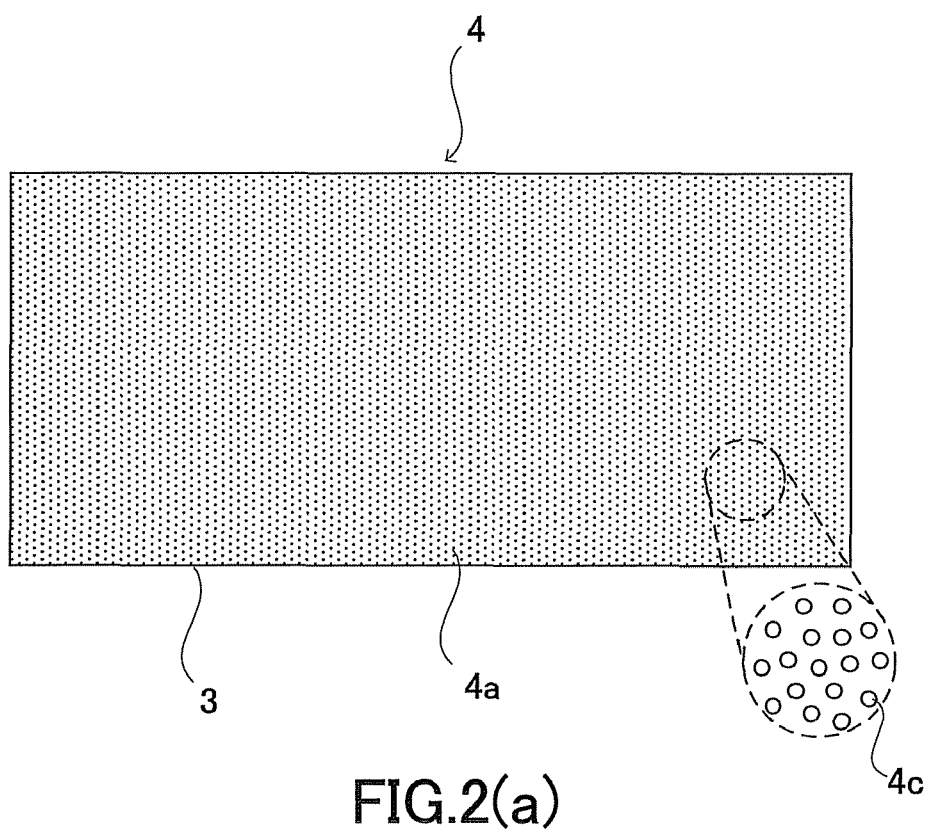
FIG. 2(a) and FIG. 2(b) are a plan view and a vertical sectional view, respectively, of a functional member relating to the first embodiment.
Figure 2B:
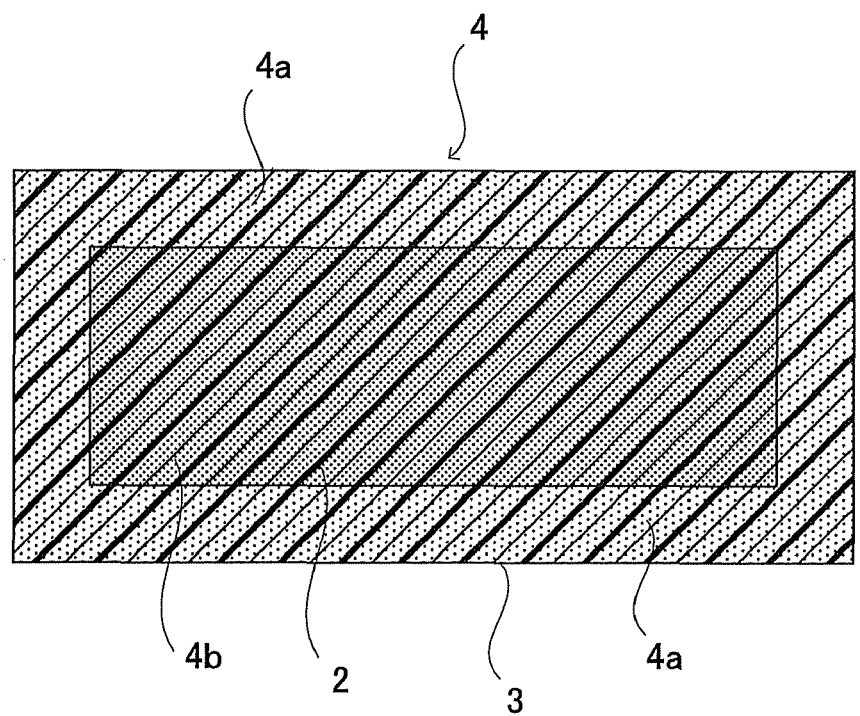

Hereinafter, the first embodiment of the present invention will be described by referring to the drawings. FIG. 1(a) and FIG. 1(b) are a plan view and a vertical sectional view, respectively, of a member relating to the present embodiment. And FIG. 2(a) and FIG. 2(b) are a plan view and a vertical sectional view, respectively, of a functional member relating to the present embodiment.

As shown in FIG. 1(a) and FIG. 1(b), there is first prepared a member 1 having a predetermined shape and yet to be treated with the carbon material 2, which will be described next, not removed. The member 1 comprises a fluororesin 3 which contains the carbon material 2. As the carbon material 2, there may be mentioned, for example, carbon fiber, carbon powder, a mixture of these, and the like.

As the fluororesin 3, there may be cited, for example, a tetrafluoroethylene/perfluoroalkyl vinyl ether copolymer (PFA), polytetrafluoroethylene (PTFE), a tetrafluoroethylene/hexafluoropropylene copolymer (FEP), a tetrafluoroethylene/hexafluoropropylene/perfluoroalkyl vinyl ether copolymer (EPE), a tetrafluoroethylene/ethylene copolymer (ETFE), or the like.

The carbon material 2 is contained in the fluororesin 3 nearly uniformly. That is, the carbon material 2 is present both in the surface portion 1a and in the inner portion 1b of the member 1.

The foregoing member 1 can be prepared by various methods. Specifically, when the fluororesin 3 is PFA, for example, there can be prepared a member 1 comprising PFA containing the carbon material 2, by blending the carbon material 2 with the PFA material, followed by injection molding. Also, when the fluororesin is PTFE, there can be prepared a member 1 comprising PTFE containing the carbon material 2, by blending the carbon material 2 with PTFE powder, followed by sintering.

Subsequently, the member 1 is exposed to an oxidizing gas containing ozone and water vapor. Accordingly, the carbon material 2 is oxidized by ozone and water vapor, turns into carbon dioxide, and disengages from the fluororesin 3. Thus, the carbon material 2 is removed from the fluororesin 3. In addition, the oxidizing gas may comprise only ozone.

Here, although C-C bonds in the carbon material 2 are cleaved by oxidation with ozone and water vapor, the C-C bonds or C-F bonds in the fluororesin 3 are not cleaved by oxidizing power of ozone. Therefore, it is believed that only the carbon material 2 is removed even by exposing the fluororesin 3 to ozone and water vapor and the composition of the fluororesin 3 is not affected at all.

Removal of the carbon material 2 is carried out in such a way that only the carbon material 2 present in the surface portion is of the member 1 is removed. That is, because removal of the carbon material 2 depends on the time period it is exposed to the oxidizing gas, the depth of the carbon material 2 removed can be controlled by controlling the time period. Thus, by controlling the time period of exposure to the oxidizing gas, it is possible to remove only the carbon material 2 present in the surface portion 1a of the member 1 and keep the carbon material 2, present in the inner portion 1b of the member 1, remaining.

Accordingly, there is prepared a functional member 4 shown in FIG. 2(a) and FIG. 2(b). In the functional member 4, the carbon material in the surface portion 4a is removed and, thus, the content of the carbon material 2 is significantly less in the surface portion 4a of the functional member 4 than in the inner portion 4b of the functional member 4.

Here, when the carbon material 2 comprises carbon fiber only or carbon powder only, the "content" refers to the content of carbon fiber or carbon powder and, when the carbon material 2 comprises a mixture of carbon fiber and carbon powder, the "content" refers to the content of the total of the carbon fiber and carbon powder.

The carbon material 2 in the surface portion 4a of the functional member 4 is substantially removed. Here, "substantially" means not only that the carbon material 2 in the surface portion 4a is completely removed but also that there is a case included where the carbon material 2 is slightly remaining in the surface portion 4a.

When the carbon material 2 is removed, there is a pore 4c formed at the place where the carbon material 2 was present. Thus, the surface portion 4a becomes porous.

According to the present embodiment, the carbon material 2 in the surface portion 1a of the member 1 is removed by exposing the member 1, formed by a fluororesin 3 containing the carbon material 2, to an oxidizing gas. Thus, a functional member 4 having improved cleanliness of the surface portion 4a can be provided, while maintaining the mechanical strength and coefficient of thermal expansion inherently possessed by the fluororesin 3 containing the carbon material 2.

Also, when this functional member 4 is used for a semiconductor manufacturing equipment (not shown in the figure), the carbon material 2 is hard to be dissolved out from the surface portion 4b by a chemical and the like. As a result, contamination of a wafer (not shown in the figure), which is a semiconductor substrate, can be suppressed.

According to the present embodiment, ozone and water vapor are used as the oxidizing gas, so that the rate of removal of the carbon material 2 can be increased compared to when ozone is used singly. That is, when ozone is used singly, only oxygen radicals come into action. However, when ozone and water vapor are used, hydroxyl radicals, that have strong oxidizing power, come into action in addition to the oxygen radicals. Accordingly, the rate of removal of the carbon material 2 can be increased.

According to the present embodiment, even when the member 1 has been fabricated in a predetermined shape, the carbon material in the whole surface portion 1a of the element 1 can be removed. In contrast, it is conceivable to provide a coating, wrapping, and the like around the fluororesin 3 with a fluororesin not containing the carbon material 2. However, when the fluororesin 3 is fabricated after it was coated or wrapped, the surface of the fluororesin 3 becomes exposed at the fabricated portion and the carbon material becomes exposed. In addition, it is difficult to coat or wrap the surface of this portion. In comparison, according to the present embodiment, even when the member 1 has been fabricated in a predetermined shape, the carbon material 2 in the whole surface portion 1a of the member 1 can be removed thereafter by exposing the member to the oxidizing gas.

The Second Embodiment

Hereinafter, the second embodiment of the present invention will be described. In addition, explanation will be omitted for contents that overlap with the above-described first embodiment.

After removing the carbon material 2 from the surface portion 1a of the member 1, the functional member 4 is heated up to around the softening temperature of the fluororesin 3. By this heating, the pore 4c in the surface portion 4a of the functional member 4 is occluded.

According to the present embodiment, the pore 4c is occluded by heating up to around the softening temperature of the fluororesin 3 after the carbon material 2 is removed. Thus, dissolution by a chemical and the like of the carbon material 2 remaining in the inner portion 4b of the functional member 4 can further be suppressed.

In addition, the present invention is not limited to the above-described contents of the embodiments, and the structures, materials, arrangements of respective members, and the like may suitably be changed as long as they do not deviate from the gist of the present invention. In the above embodiments, there was described an example where the functional member 4 was used for a semiconductor manufacturing equipment but its application is not limited to a member used for the semiconductor manufacturing equipment. That is, the functional member 4 can be used for various machine structures.

Example

Figure 3:
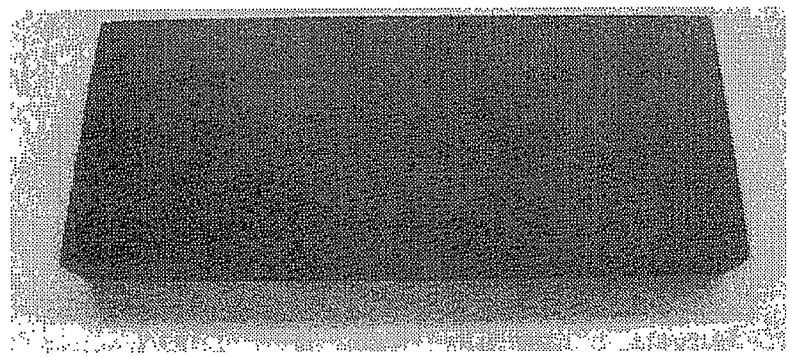
FIG. 3 is a photograph of a sample taken before the experiment relating to the example.
Figure 4:
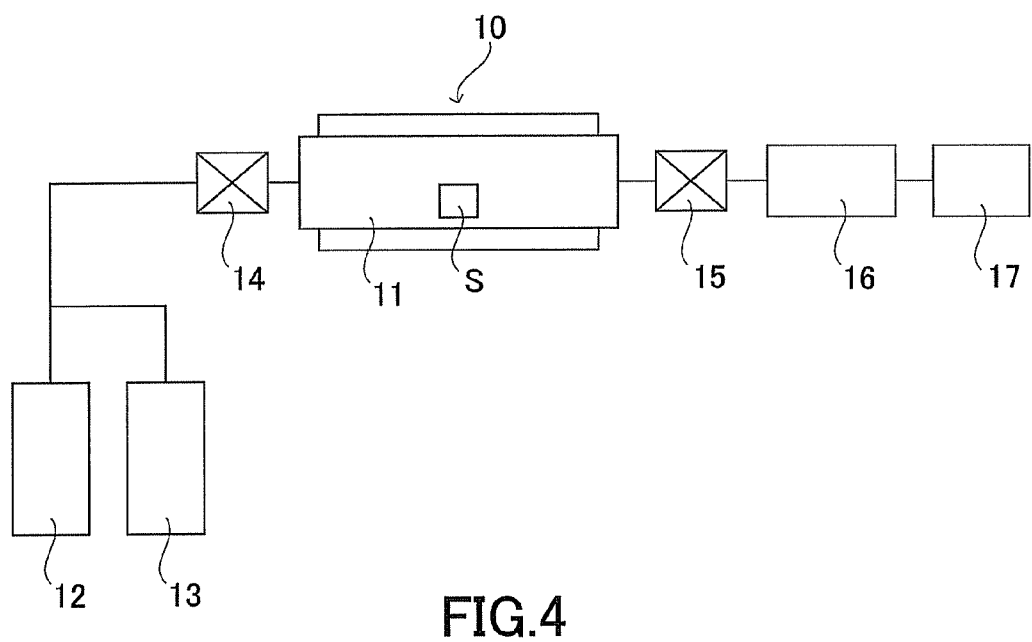
FIG. 4 is a schematic block diagram of the experimental apparatus for treating a sample relating to the example.
Figure 5:
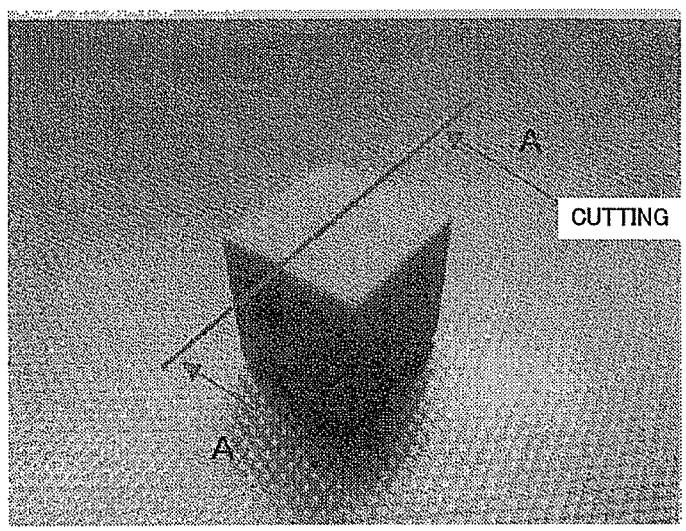
FIG. 5 is a photograph of a sample taken after the experiment relating to the example.
Figure 6:
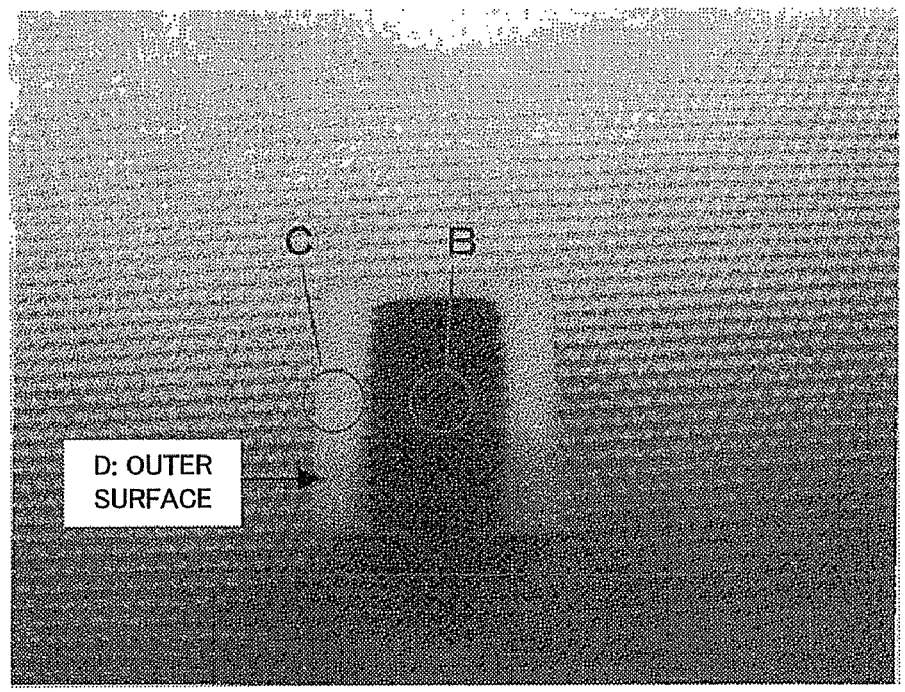
FIG. 6 is a photograph of a cross-section A-A of FIG. 5.
Figure 7:
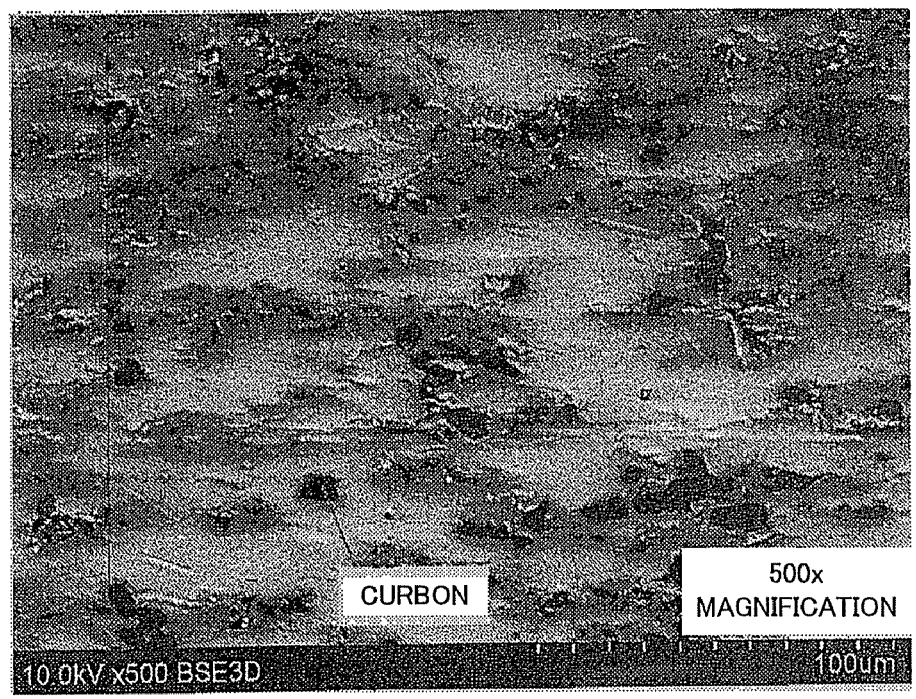
FIG. 7 is an enlarged microscopic photograph of portion B of FIG. 6.
Figure 8:
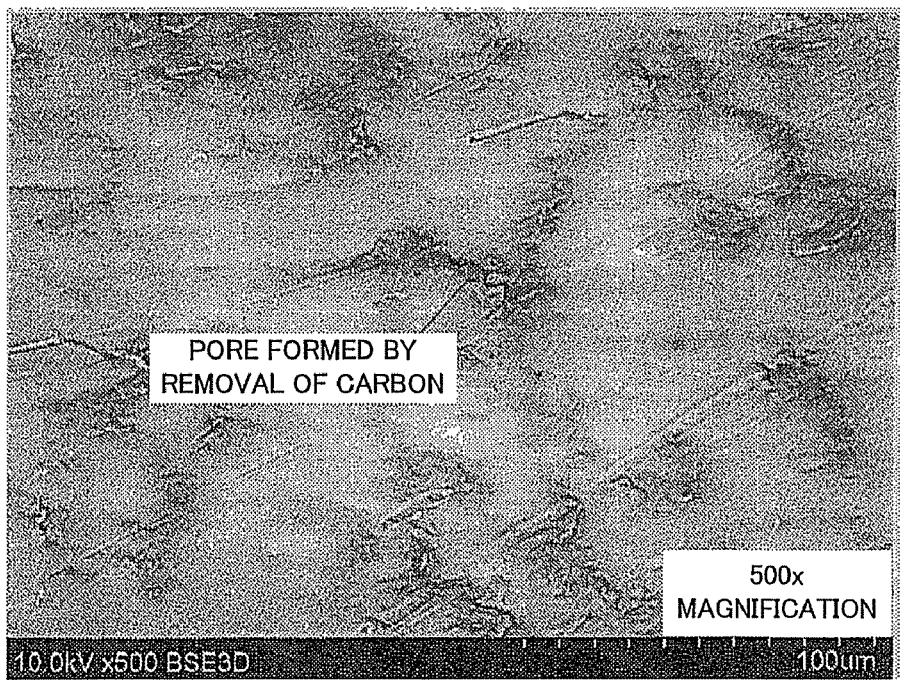
FIG. 8 is an enlarged microscopic photograph of portion C of FIG. 6.
Figure 9:
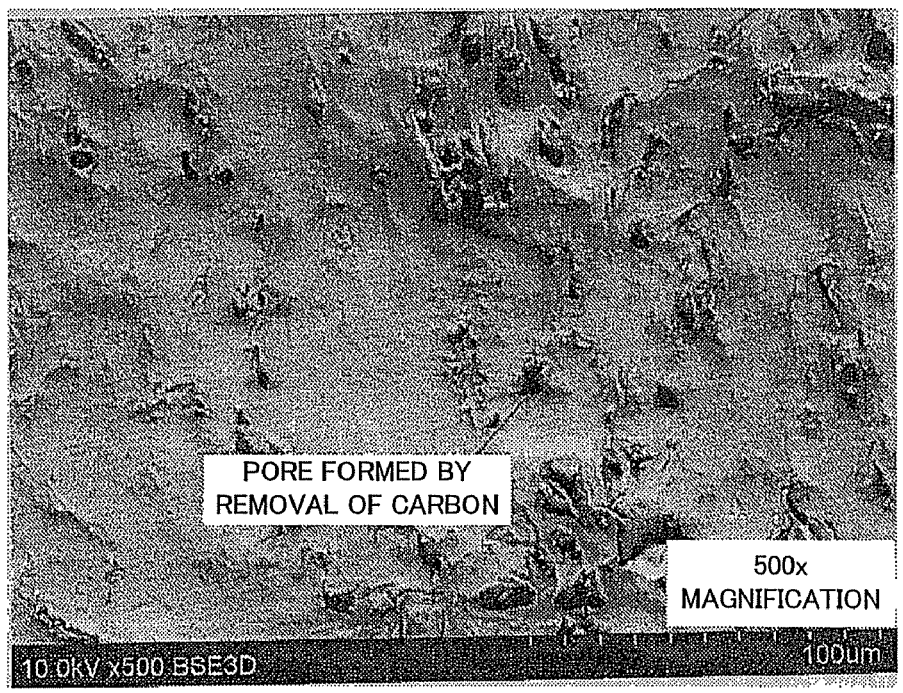
FIG. 9 is an enlarged microscopic photograph of portion D of FIG. 6.

Hereinafter, an example will be described. In the present example, PFA containing carbon fiber was prepared and was put to experiment whether the carbon fiber in the surface portion of PFA could be removed as described in the above embodiments or not. FIG. 3 is a photograph of a sample taken before an experiment relating to the example. FIG. 4 is a schematic block diagram of an experimental apparatus for treating the sample relating to the example. FIG. 5 is a photograph of the sample taken after the experiment relating to the example. FIG. 6 is a photograph of cross-section A-A of FIG. 5. FIG. 7 is an enlarged microscopic photograph of portion B of FIG. 6. FIG. 8 is an enlarged microscopic photograph of portion C of FIG. 6. FIG. 9 is an enlarged microscopic photograph of portion D of FIG. 6.

(1) Sample

First, a sample of PFA containing carbon fiber was prepared. Ordinarily, PFA is translucent but the sample was black in color as shown in FIG. 3 because the carbon fiber was contained throughout PFA. This sample was cut into a predetermined piece and used for experiment.

(2) Experimental Apparatus

To carry out an experiment, an experimental apparatus 10 shown in FIG. 4 was used. The experimental apparatus 10 is mainly composed of a chamber 11 to treat a sample S, an ozone generator 12 to generate ozone, a water vapor generator 13 to generate water vapor, a valve 14 to control the flow rates of ozone and water vapor generated by ozone generator 12 and water vapor generator 13, respectively, a valve 15 to control the pressure inside the chamber 11, an ozone decomposer 16 to decompose ozone which is exhausted from the chamber 11, an exhaust system 17, and the like.

(3) Experimental Conditions

The sample S was introduced into the chamber 11, and the temperature and pressure were maintained at 105° C. and 75 KPa, respectively. Furthermore, ozone was generated by the ozone generator 12 and, at the same time, water vapor was generated by the water vapor generator 13. These were supplied to the chamber 11 by controlling with the valve 14 so that ozone becomes 9% by volume and water vapor flows at 4.5 cc/min. In addition, the time period during which ozone and water vapor were supplied was 30 hours.

(4) Experimental Results

As shown in FIG. 5 and FIG. 6, the surface portion of the sample was turbid white in color. This is thought to be because the carbon fiber in the surface portion of the sample was removed. On the other hand, the inner portion of the sample remained black as shown in FIG. 5. This is thought to be because the carbon fiber remains in the inner portion of the sample.

In addition, as shown in FIG. 7, it was confirmed that the carbon fiber remained in the inner portion of the sample (portion B). And, as shown in FIG. 8 and FIG. 9, it was confirmed that carbon fiber was removed from the surface portion of the sample (portion C and portion D).

From these results, it was confirmed that carbon fiber of only the surface portion of the sample could be removed by ozone and water vapor.

The invention claimed is:

1. A functional member comprising a fluororesin containing a carbon material and having surface cleanliness, the content of the carbon material in a surface portion of the functional member being significantly less than the content of the carbon material in an inner portion of the functional member.

2. The functional member according to claim 1, wherein the carbon material is substantially removed from the surface portion of the functional member.

3. The functional member according to claim 1, wherein the fluororesin is a tetrafluoroethylene/perfluoroalkyl vinyl ether copolymer or polytetrafluoroethylene.

4. A method for manufacturing a functional member having surface cleanliness, comprising:
   providing a member which is formed by a fluororesin containing a carbon material and has a predetermined shape; and
   exposing the member to an oxidizing gas to remove the carbon material present in the surface portion of the member.

5. The method for manufacturing a functional member according to claim 4, wherein the member is heated after the carbon material present in the surface portion of the member is removed.

6. The method for manufacturing a functional member according to claim 4, wherein the carbon material is at least either of carbon fiber and carbon powder.

7. The method for manufacturing a functional member according to claim 4, wherein the fluororesin is a tetrafluoroethylene/perfluoroalkyl vinyl ether copolymer or polytetrafluoroethylene.

8. The method for manufacturing a functional member according to claim 4, wherein the oxidizing gas comprises ozone.

9. The method for manufacturing a functional member according to claim 8, wherein the oxidizing gas comprises water vapor.

10. A semiconductor manufacturing equipment, comprising the functional member according to claim 1.

* * * * *